(12) United States Patent
Vano Newman

(10) Patent No.: US 10,218,569 B2
(45) Date of Patent: Feb. 26, 2019

(54) DISTRIBUTED STORAGE QUOTA ENFORCEMENT

(71) Applicant: Microsoft Technology Licensing, LLC, Redmond, WA (US)

(72) Inventor: Joaquin Vano Newman, Duvall, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 218 days.

(21) Appl. No.: 15/390,146

(22) Filed: Dec. 23, 2016

(65) Prior Publication Data

US 2018/0183664 A1 Jun. 28, 2018

(51) Int. Cl.
*H04L 12/24* (2006.01)
*H04L 29/08* (2006.01)
*G06F 17/30* (2006.01)

(52) U.S. Cl.
CPC .... *H04L 41/0806* (2013.01); *G06F 17/30082* (2013.01); *H04L 67/1095* (2013.01); *H04L 67/1097* (2013.01)

(58) Field of Classification Search
CPC ............. H04L 41/0806; H04L 67/1097; H04L 67/1095; G06F 17/30377; G06F 17/30312
See application file for complete search history.

(56) References Cited

U.S. PATENT DOCUMENTS

| 8,634,821 B2* | 1/2014 | Raleigh ............... H04L 41/0806 455/419 |
| 9,383,936 B1 | 7/2016 | Freitas et al. |
| 9,883,413 B2* | 1/2018 | Cama .................... H04W 24/08 |
| 2006/0136638 A1* | 6/2006 | Banning ................. G06F 9/505 710/244 |
| 2012/0311571 A1 | 12/2012 | Morgan |
| 2013/0097680 A1 | 4/2013 | Bendapudi et al. |
| 2013/0346787 A1 | 12/2013 | Rueegg et al. |
| 2014/0149475 A1 | 5/2014 | Darcy et al. |
| 2014/0297781 A1 | 10/2014 | Brand |

(Continued)

OTHER PUBLICATIONS

Kannan, et al., "Kubernetes disk accounting", https://github.com/kubernetes/kubernetes/blob/master/docs/proposals/disk-accounting.md, Published on: Nov. 16, 2015, 10 pages.

(Continued)

*Primary Examiner* — Kim T Nguyen
(74) *Attorney, Agent, or Firm* — Ray Quinney & Nebeker, P.C.; Thomas M. Hardman; Stephen A. Wight

(57) ABSTRACT

Embodiments are directed to client-side enforcement of storage quotas in a cloud service or distributed computing environment. A storage driver is configured to monitor access to an external storage system by a cloud process and to enforce storage limits for the external storage system. The storage driver intercepts reads and writes from the process to the external storage system and updates a local state to track the process's usage of the external storage system. A storage quota database is periodically checked for an updated storage usage and, if the updated storage usage is not present, then the external storage is scanned to obtain the updated storage usage. The updated storage usage is provided to the storage driver, which overwriting the local state. The storage driver continues to update the local state based upon the intercepted reads and writes.

20 Claims, 4 Drawing Sheets

(56) References Cited

U.S. PATENT DOCUMENTS

2015/0067069 A1   3/2015  Gourevitch et al.
2015/0089065 A1   3/2015  Kasso et al.
2015/0269511 A1   9/2015  Busayarat et al.
2016/0055021 A1   2/2016  Beveridge et al.
2016/0063258 A1   3/2016  Ackerly

OTHER PUBLICATIONS

"Windows Azure Pack Websites V2 Update Rollup 9", https://www.microsoft.com/en-us/download/details.aspx?id=50746, Retrieved on: Nov. 8, 2016, 5 pages.

Pollack, Kristal T., et al., "Quota Enforcement for High-Performance Distributed Storage Systems", IBM Almaden Research Center, 2007, 13 pages.

* cited by examiner

DISTRIBUTED STORAGE QUOTA ENFORCEMENT

BACKGROUND

Applications may run in multiple servers in a cloud service and may requires access to a storage system external to the cloud service. Whenever the applications read, write, or delete content, the external storage system itself enforces quotas, such as the storage space available to the applications. This quota enforcement is provided at the server side and, therefore, the applications are unaware of the current status of the storage or the available space. This makes it difficult to scale out applications on the cloud service when the available storage in a remote system cannot be tracked by the cloud service. Specific interfaces to the external storage or knowledge of the external storage's operation is required to allow the cloud service to track available storage and to keep cloud applications within quotas.

Problems arise when cloud service tenants want to use existing external storage systems that do not provide functionality required by the cloud service for tracking quotas. For example, the external storage systems may provide limited quota enforcement, such as only at the root level and not per folder or per tenant.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A distributed computing system for controlling access to an external storage comprises a quota database for storing usage information for the external storage, an activation service for configuring an application to run on a machine in the distributed computing system, the activation service configured to retrieve the usage information related to the application's access to the external storage, and a remote storage driver on the machine, the remote storage driver configured to provide access to the external storage and to receive the usage information from the activation service, wherein the remote storage driver enforces external storage quotas by restricting access if the application's usage exceeds a preset quota. The remote storage driver monitors a current state of the external storage by tracking use of the external storage by the application.

The activation service initiates a timer after retrieving the usage information and checks for changes to the usage information in the database when the timer expires. If the usage information in the database has changed, then the activation service provides updated usage information from the database to the remote storage driver. If the usage information in the database has not changed, then the activation service scans the external service for current usage information and provides updated usage information to the database and to the remote storage driver.

The remote storage driver updates a current state of the external storage using information from the activation service.

A computer-implemented method comprises reading a storage limit and a storage usage from a database in a cloud service, wherein the storage limit and storage usage are associated with a storage system external to the cloud service; creating a process on the cloud service, wherein the process is configured to access the external storage system; configuring a storage driver on the cloud service to monitor access to the external storage system by the process and to enforce storage limits for the external storage system; and checking the database for an updated storage usage, wherein if the updated storage usage is present, then providing the updated storage usage to the storage driver, and wherein if the updated storage usage is not present, then scanning the external storage to obtain the updated storage usage.

The method further comprises saving the updated storage usage obtained from the external storage scanning to the database.

The method further comprises initiating a timer to determine how often to check the database for the updated storage usage.

The method further comprises creating two or more additional processes on the cloud service, wherein the two or more additional processes are also configured to access the external storage system; configuring a separate storage driver to monitor access to the external storage system and to enforce storage limits on the external storage system for each of the two or more additional processes; and independently checking the database on behalf of each separate storage driver to detect the updated storage usage, wherein if the updated storage usage is present, then providing the updated storage usage to the storage driver for which the database check was performed.

The method further comprises initiating timers associated with each separate storage driver to determine how often to check the database for the updated storage usage.

The method further comprises intercepting, by the storage driver, reads and writes from the process to the external storage system; and updating a local state in the storage driver, based upon the intercepted reads and writes, to track the process's usage of the external storage system.

The method further comprises blocking, by the storage driver, the reads and writes from the process to the external storage system when the local state exceeds the storage limit.

The method further comprises overwriting the local state in the storage driver when the updated storage usage is present in the database.

The method further comprises saving the updated storage usage as determined by scanning the external storage to the database; and overwriting the local state in the storage driver using the updated storage usage as determined by scanning the external storage.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the accompanying drawings in which.

DETAILED DESCRIPTION

Figure 1:
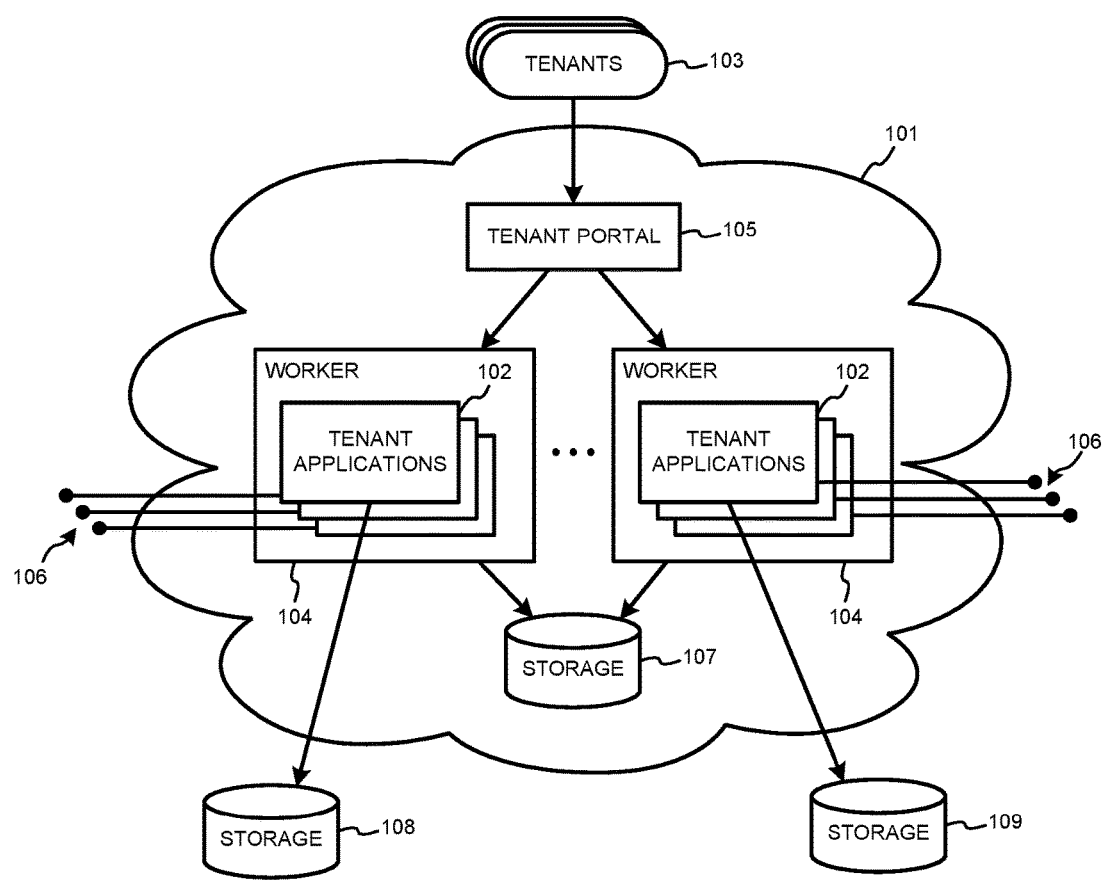
FIG. 1 is a simplified block diagram of a distributed computing service or cloud service that supports a plurality of tenant applications for cloud service tenants.

FIG. 1 is a simplified block diagram of a distributed computing service or cloud service 101 that supports a plurality of tenant applications 102 for cloud service tenants 103. Cloud service 101 may be a public cloud, such as the Azure® cloud service from Microsoft Corporation, that offers distributed computing services to any user. Alternatively, cloud service 101 may be a private or on-premises cloud service that supports a specific enterprise. The tenant applications 102 run on worker entities 104, which may be, for example, virtual machines (VM), servers, or other processor-based devices. Cloud service 101 provides the capability to scale-up or scale-down the number of workers 104 supporting a cloud tenant's application based upon user demand. Cloud service 101 also provides failover support to keep tenant applications 102 running when a server or VM fails.

Cloud service tenants 103 access the cloud service through a tenant portal 105, which allows the tenants 103 to designate the type and number of tenant applications 102 that should be running. The tenant applications may be, for example, a web process that supports a tenant website. Users may access the website through a designated service endpoint 106. A tenant may run multiple tenant applications 102 across multiple workers 104 to support the same website, such during times of high user demand.

The tenant applications may use a cloud-based file storage entity 107, such as to store tenant and user data. Alternatively, or in addition to storage 107, tenant applications 102 may use external file storage entities 108, 109. The external storage 108 or 109 may be hosted by the tenant or by a third-party service other than the service provider that offers cloud service 101.

Cloud service 101 provides sandboxing to protect tenant applications 102. Because tenant applications 102 for multiple, unrelated tenants 103 are running on each worker 104, the cloud service 101 must ensure that each tenant application 102 does not impact the other tenant applications. For example, one tenant application 102 should not prevent another tenant application from accessing cloud services resources, such as processor cycles, storage space, communication bandwidth, and the like. Additionally, the data stored by one tenant application 102 to cloud storage 107 should not be accessible to other tenant applications.

Cloud service 101 also enforces quotas and limits for each tenant. Each tenant 103 enrolls in a selected cloud service subscription, which limits the availability of cloud service resources, such as the number worker processes the tenant may access to run tenant applications 102 and the amount of storage space available to the tenant's applications. When the tenant applications 102 use cloud service storage 107, it is relatively easy to monitor and enforce a tenant's storage quotas and limits since all the read/write/delete operations take place within the cloud service 101. However, when a tenant application 102 uses external storage 108 or 109, cloud service 101 does not know how much space is being used on the storage device. Cloud service 101 may not even be aware of the quotas or limits assigned to a tenant for the external storage device. In existing systems, the external storage devices manage user quotas and limits (i.e., server-side quota management). It would be useful if cloud service 101 could manage user quotas and limits for external storage devices from the client side.

Figure 2:
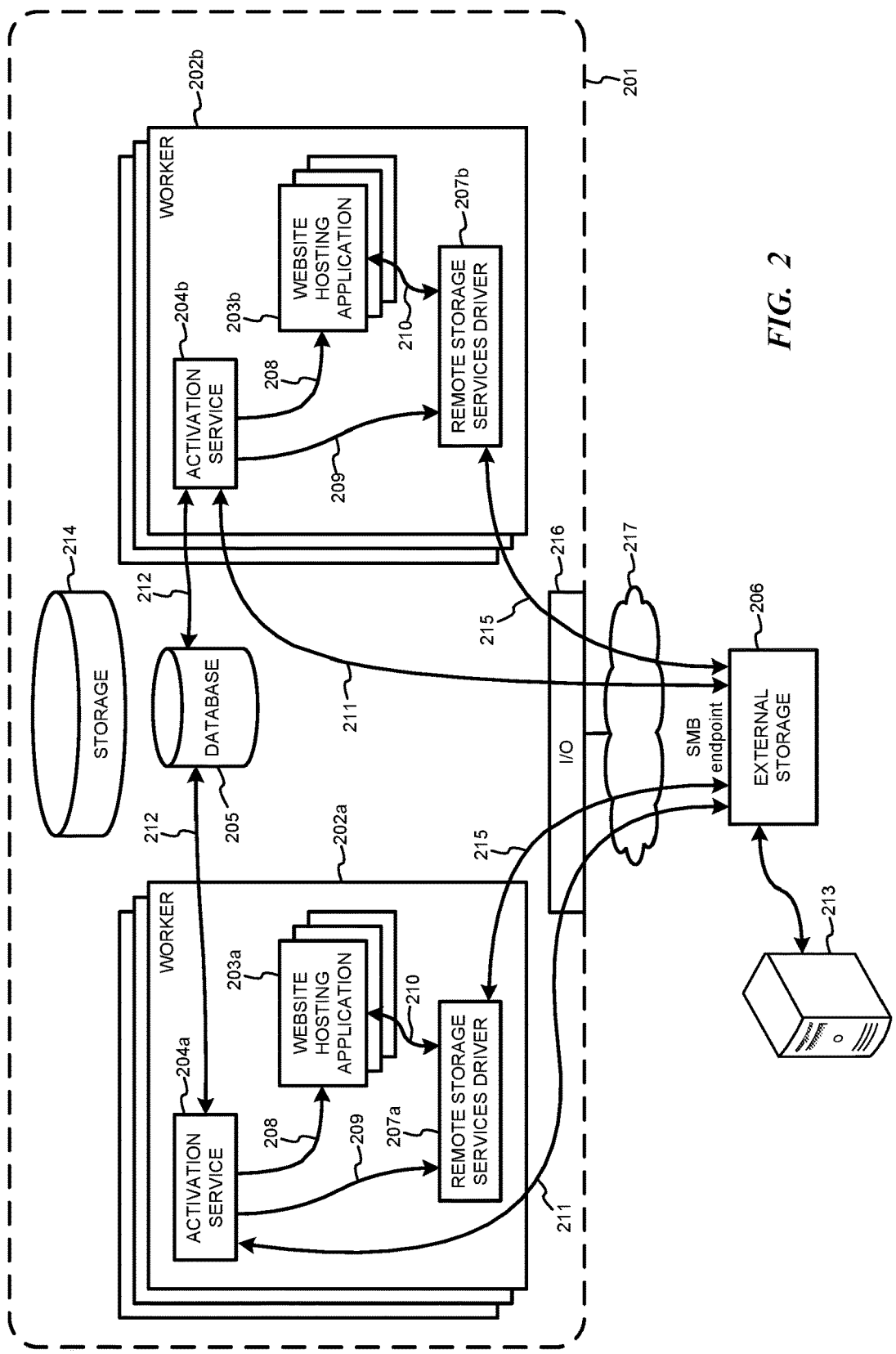
FIG. 2 is a block diagram of a system for providing client-side distributed storage quota enforcement.

FIG. 2 is a block diagram of a system for providing client-side distributed storage quota enforcement. A cloud service 201 comprises a plurality of workers 202. Each worker 202 supports a plurality of worker processes 203, such as website hosting applications. An activation service 204 on each worker 202 is responsible for initiating and managing the website hosting applications 203. A database 205 functions as a quota and limits repository for remote storage 206 and a storage usage cache for website hosting applications 203. The website hosting applications 203 may access remote storage, such as file server 206, which is external to cloud service 201. File server 206 may be accessed using a file sharing protocol, such as the Server Message Block (SMB) protocol. File server 206 may be designated by an SMB endpoint, and website hosting applications 203 can read and write data to that endpoint. Website hosting applications 203 access the remote file server 206 via remote storage services driver 207. Read/write commands from website hosting applications 203 are sent to remote storage services driver 207, which passes 215 the commands to the appropriate SMB endpoint for file server 206.

At deployment time, cloud service 201 provisions a single shared folder that is the SMB endpoint for the external storage 206. From then on, every time a new instance of website hosting applications 203 is created, then cloud service 201 points the new instance to the SMB endpoint. The application may use the existing folder for that tenant or a new folder may be created to hold content for other customers on the file server.

Cloud service 201 is highly dynamic and allows tenant processes to be deployed to any machine. When a tenant requests activation of a website, for example, the cloud service 201 designates a specific work 202a for that website. The activation service 204a on that worker creates 208 a worker process 203a for the website hosting application. Activation service 204a also adds the website hosting application process 203a into a work sandbox by notifying 209 remote storage services driver 207a that the process needs to be sandboxed. The tenant may scale up the website by requesting the cloud service 201 to host additional instances of the website hosting application, which would be loaded on other worker processes 203b on other workers 202b, for example.

Driver 207 has its own internal state called sandbox context per worker process 203. The sandbox context tracks the quotas and limits for each worker process 203 and the usage for each worker process 203. Driver 207 then tracks all writes and deletes against the limits and quotas per worker process to maintain an updated local usage value.

Driver 207a intercepts all calls 210 from process 203a and functions as the sandbox by blocking the specific operations. One type of operations that may be blocked is a write to the remote storage 206 at the SMB endpoint whenever the tenant has reached their quota. The driver 207a block the website hosting application 203a from writing more that allowed to protect the external file server 206. Driver 207a obtains quota and current usage information from database 205 indirectly, such as by updates 209 from activation service 204a.

Activation service 204a may be in charge of interacting with database 205 for worker 202a. Activation service 204a obtains the quotas and limits and the last known usage information from database 205. This information provided to driver 207*a* when a new website hosting application is started on worker process 203*a*. While the website is running, activation service 204*a* starts a timer per website or per worker process for a scanning process. When the timer expires, the activation service 204*a* goes back to the database 205 or directly queries or scans 211 external storage 206 to determine whether if the actual content usage has changed. This compensates for the situation where other users are storing more content to the external storage 206 and causing out-of-band changes to external storage 206 without the knowledge of worker 202*a* or cloud storage 201. The scanning maintains consistency over time. If the website hosting application instances 203 are running in multiple workers 202, there is the possibility that the overall usage is going to exceed the storage limit or quotas for external storage 206. The scanning process essentially provides a soft quota wherein out-of-band use will not be caught immediately, but will be detected during scanning 211. The scanning timer may be set to any appropriate value based upon, for example, the quotas and limits, current or past usage, known number of users, and the like to reduce the chance of compromising the external storage 206.

When multiple workers 202 are running instances of the same website hosting application 203, the activation service 204 may check the current usage level saved to database 205 before scanning 211 the external storage 206 when the scanning timer expires. After checking, if the external storage usage value was recently changed in the database (e.g., since the last scan 211 by the activation service), then the activation service 204 will update using that value and will not perform another scan. This prevents the activation services 204 from scanning too frequently. Each activation service 204 trusts the value that is in database 205, which was updated by another activation service 204. This provides a means for the activation services 204 to communicate usage level updates to each other and prevents multiple workers from scanning the external storage within a brief time.

For example, a tenant may have a file storage quota for external storage 206, such a limit to write up to only 100 megabytes. Activation service 204*a* will read 212 the quota information from database 205 when it starts process 203*a* and then pushes the quota information to driver 207*a*. In addition to providing the quota limit to driver 207*a*, activation service 204*a* may also provide the last usage recorded in database 205. This informs driver 207*a* how much storage has already been used and the total storage limit. For example, if 40 MB of data have been written to external storage 206 and the limit is 100 MB, then driver 207*a* is not going to allow process 203*a* to write more than 60 MB of additional data to the storage 206.

A problem may arise when there is not a single worker process 203*a*. When multiple worker processes 203*a*, 203*b* are running the website hosting application in multiple machines at the same time, when the application will be receiving multiple requests from multiple customers. This may cause a problem when each process 203*a* is writing to the same external storage SMB endpoint 206. For example, each worker process 203*a*, 203*b* may attempt to write 60 megabytes through the respective drivers 207*a*, 207*b*. Each driver believes that the quota has 60 megabytes available, but if both drivers 207*a*, 207*b* write 60 MB, then the total allowed quota will be exceeded.

Cloud service 201 minimizes the risk of exceeding the external store quota by applying scanner logic in the activation service 204*a*, 207*b*. The scanner logic detects if there are out-of-band writes to the external storage 206. Activation service 204*a*, 204*b* reads current quotas and limits from database 205 and updates drivers 207*a*, 207*b* with the current usage on external store 206. Drivers 207*a*, 207*b* may also continuously or periodically update database 205 as each driver writes additional data to external storage 206. This provides notification of any increased storage usage to other drivers 207 on remote workers 202.

In existing systems, a third-party file server manages its own user quotas and limits. Because the file server is an external device, existing cloud services do not know the current status of the file server's quota and limits and, therefore, may continue to write data and information to the external file server well beyond a cloud service tenant's authorized storage limit. This may happen, for example, if the tenant has multiple instances 203*a*, 203*b* of the website hosting application that both use file server 206. The total amount of data written by all tenant's instances would need to be tracked. Additionally, a tenant may have one or more other services running on an external system 213. These external services may also use storage 206, and this usage would also count against the tenant's storage quota. Communications between external system 213 and storage 206 are out-of-band to cloud server 201. Thus, cloud service 201 does not know how much of a tenant's storage quota is used by external system 213. Similarly, communications between storage 206 and a website hosting application 203*b* on worker 202*b* are out-of-band to a different website hosting application 203*a* on a different worker 202*a*. As a result, different workers 202*a*, 202*b* in cloud service 201 are not aware of how much of the tenant's storage quota is used by processes on the other workers.

In the system of FIG. 2, remote storage services deriver 207 uses information from database 205 to manage the quotas and limits for file server 206 on a per-tenant basis. The tenants may already have existing storage technology or devices when they subscribe to use cloud service 201. Instead of requiring tenants to use storage 214 in cloud service 201, the tenants may continue to use their own storage solution 206, such as network-attached storage (NAS) devices or storage hosted by other cloud services.

When a tenant configures services, such as a website hosting application 203, on cloud service 201, they can use cloud based storage 214 and/or the tenant can configure an external storage 206 by providing an SMB endpoint for the external device. Remote storage services driver 207 allows for sandboxing of the processes 203 on workers 202 from the client side and enforces storage quotas. Because there may be multiple workers 202 that access the same remote storage 206, cloud service 201 provides for coordination across different remote storage services drivers 207 on multiple workers 202.

During operation, depending on how the website has been scaled out, multiple workers 202 may run the same website 203 on multiple machines. When website hosting application 203*a* attempts to write data to external store 206, the remote storage services driver 207*a* sees the write request 210 from website hosting application 203*a*. Remote storage services driver 207*a* automatically obtains the current content amount and last usage for the tenant's subscription on external store 206. Driver 207*a* obtains this information from database 205 directly through query 211 or indirectly, such as through updates 209 from activation service 204*a*. If the tenant has space available on external storage 206, then driver 207*a* allows the write request 215 to pass to the SMB endpoint for storage 206.

Driver 207*a* may keep a running count storage 206 usage so that it does not have to query to database 205 for every new write request. Instead, after getting a current content amount and last usage from database 205, driver 207a may update the value locally over a period, such as for five minutes, before requesting an updated content amount and last usage. It will be understood that the driver 207a may keep track of both writes and deletes and other changes to data on remote store 206. Periodically, such as after a set time or after a set number of operations, driver 207a may notify database 205 of any writes, deletes, or other operations on storage 206 so that database 205 will be updated when another driver 207b on another worker 202b needs to write to external storage 206.

It will be understood that the servers, machines, or processes running in cloud service 201 may access external storage 206 using any appropriate communication link. Input/output (I/O) interface 216 on cloud service 201 provides access to external storage 206 through network 217, which may be any public or private data network, such as the Internet or an intranet or enterprise network.

Figure 3:
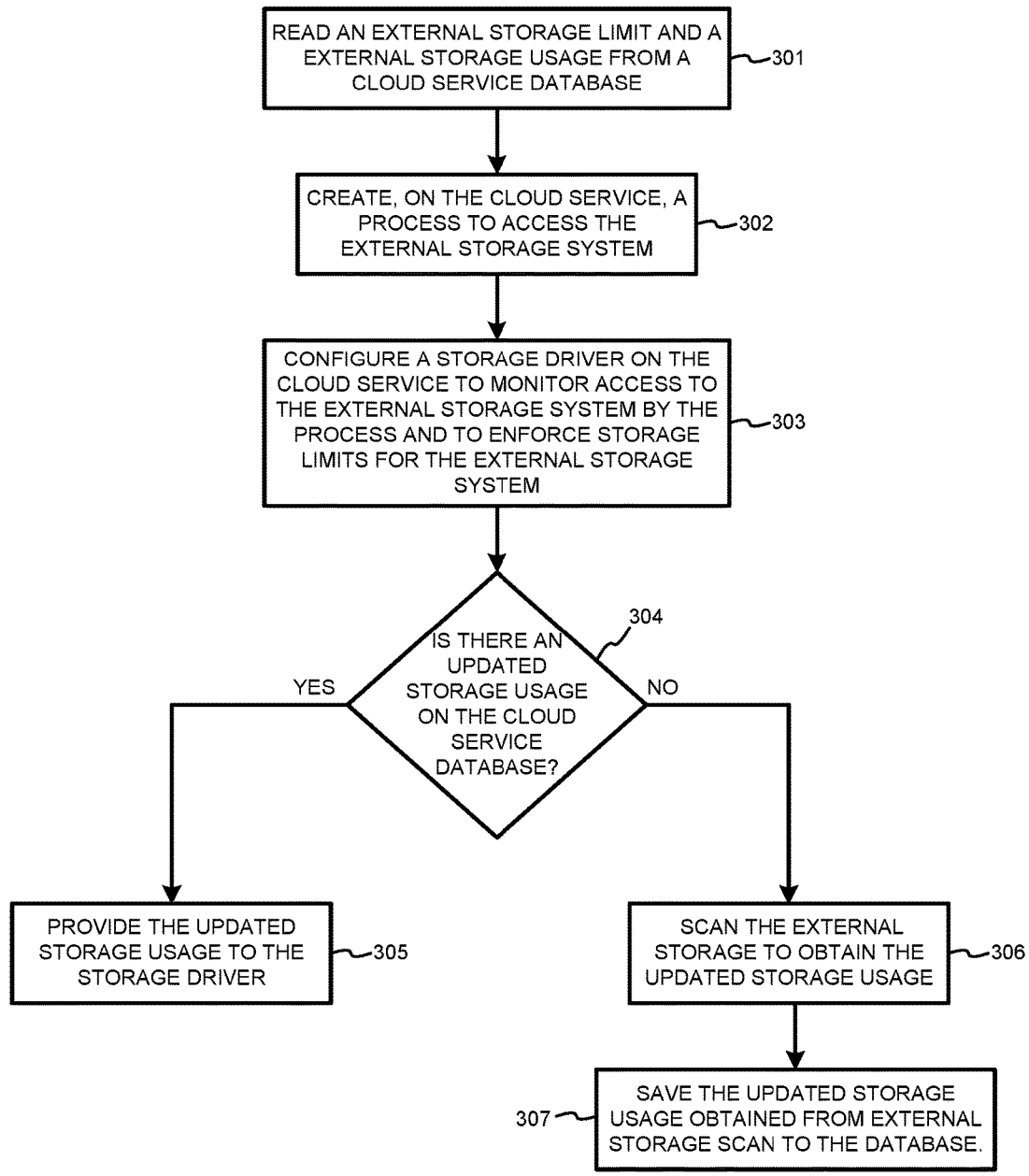
FIG. 3 is a flowchart illustrating a computer-implemented method for quota enforcement in a distributed storage system.

FIG. 3 is a flowchart illustrating a computer-implemented method for quota enforcement in a distributed storage system. In step 301, a storage limit and a storage usage are read from a database in a cloud service. The storage limit and storage usage are associated with a storage system external to the cloud service. In step 302, a process is created on the cloud service, wherein the process is configured to access the external storage system. In step 303, a storage driver is configured on the cloud service to monitor access to the external storage system by the process and to enforce storage limits for the external storage system. The process and the storage driver may be running on the same processor, virtual machine, or server in the cloud service.

In step 304, the cloud storage database is checked for an updated storage usage. In step 305, if an updated storage usage is present in the database, then the updated storage usage is provided to the storage driver. In step 306, if an updated storage usage is not present in the database, then the external storage is scanned to obtain the updated storage usage. In step 307, the updated storage usage obtained from scanning the external storage is saved to the database.

In other embodiments, the method further comprises initiating a timer to determine how often to check the database for the updated storage usage.

In other embodiments, the method further comprises creating two or more additional processes on the cloud service, wherein the two or more additional processes are also configured to access the external storage system; configuring a separate storage driver to monitor access to the external storage system and to enforce storage limits on the external storage system for each of the two or more additional processes; and independently checking the database on behalf of each separate storage driver to detect the updated storage usage, wherein if the updated storage usage is present, then providing the updated storage usage to the storage driver for which the database check was performed. The method may further comprise initiating timers associated with each separate storage driver to determine how often to check the database for the updated storage usage.

In other embodiments, the method further comprises intercepting, by the storage driver, reads and writes from the process to the external storage system; and updating a local state in the storage driver, based upon the intercepted reads and writes, to track the process's usage of the external storage system. The method may further comprise blocking, by the storage driver, the reads and writes from the process to the external storage system when the local state exceeds the storage limit. The method may further comprise overwriting the local state in the storage driver when the updated storage usage is present in the database. The method may further comprise saving the updated storage usage as determined by scanning the external storage to the database; and overwriting the local state in the storage driver using the updated storage usage as determined by scanning the external storage.

Figure 4:
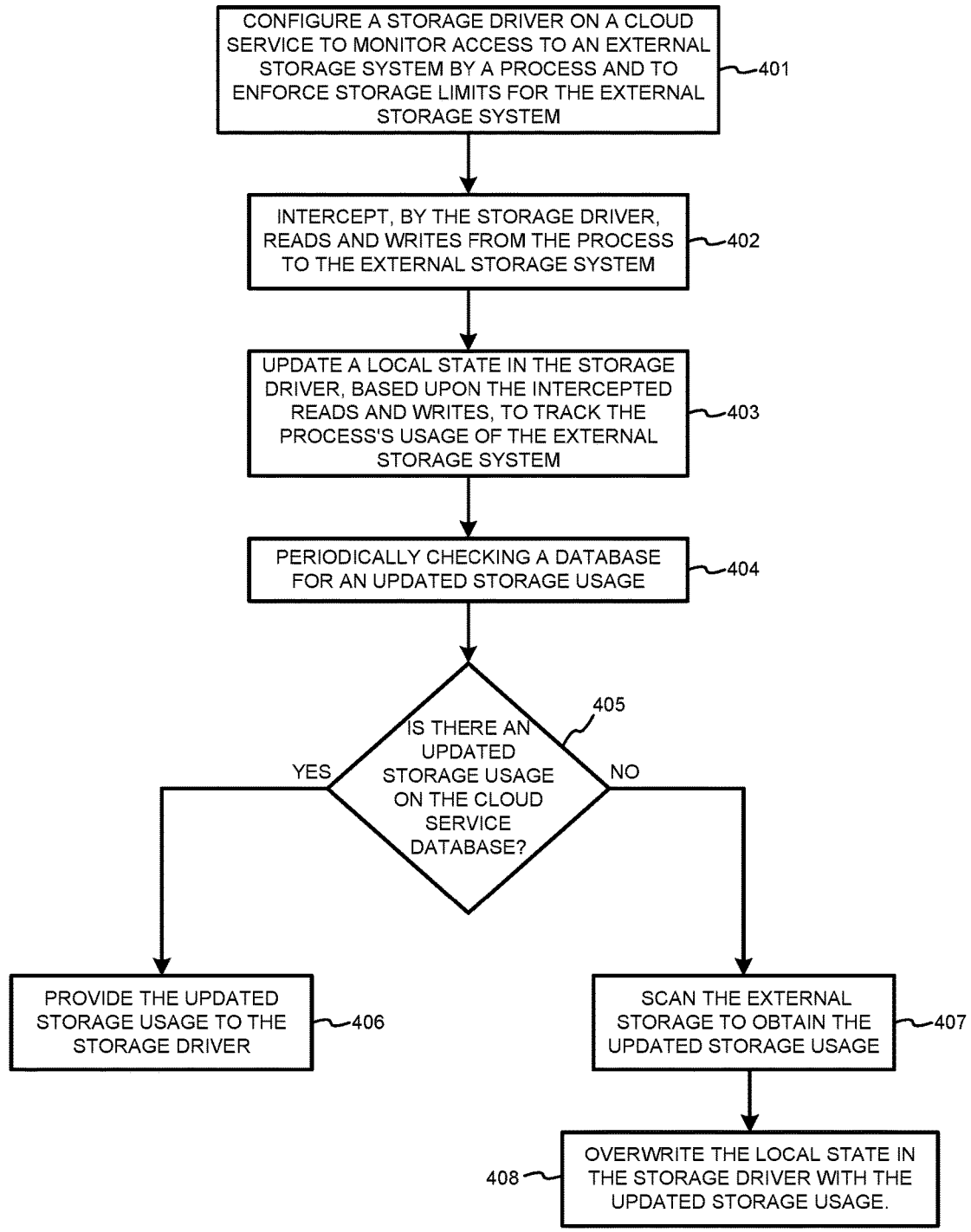
FIG. 4 is a flowchart illustrating an alternative computer-implemented method for quota enforcement in a distributed storage system.

FIG. 4 is a flowchart illustrating an alternative computer-implemented method for quota enforcement in a distributed storage system. In step 401, a storage driver is configured on a cloud service to monitor access to an external storage system by a process and to enforce storage limits for the external storage system. In step 402, the storage driver intercepts reads and writes from the process to the external storage system. In the 403, a local state is updated in the storage driver, based upon the intercepted reads and writes, to track the process's usage of the external storage system.

In step 404, a database on the cloud service is periodically checked for an updated storage usage. In step 405, the cloud storage database is checked for an updated storage usage. In step 406, if an updated storage usage is present in the database, then the updated storage usage is provided to the storage driver. In step 407, if an updated storage usage is not present in the database, then the external storage is scanned to obtain the updated storage usage. In step 406, the local state in the storage driver is overwritten with the updated storage usage.

The method may further comprise blocking, by the storage driver, the reads and writes from the process to the external storage system when the local state exceeds the storage limit.

The method may further comprise continuing to update the local state in the storage driver, based upon the intercepted reads and writes, after overwriting the local state with the updated storage usage.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A distributed computing system for controlling access to an external storage, comprising:
    a quota database for storing usage information for the external storage;
    an activation service for configuring an application to run on a machine in the distributed computing system, the activation service configured to retrieve the usage information related to the application's access to the external storage; and
    a remote storage driver on the machine, the remote storage driver configured to provide access to the external storage and to receive the usage information from the activation service, wherein the remote storage driver enforces external storage quotas by restricting access if the application's usage exceeds a preset quota.

2. The distributed computing system of claim 1, wherein the remote storage driver monitors a current state of the external storage by tracking use of the external storage by the application.

3. The distributed computing system of claim 1, wherein the activation service initiates a timer after retrieving the usage information, and wherein the activation service checks for changes to the usage information in the database when the timer expires.

4. The distributed computing system of claim 3, wherein if the usage information in the database has changed, then the activation service provides updated usage information from the database to the remote storage driver; and wherein if the usage information in the database has not changed, then the activation service scans the external storage for current usage information and provides updated usage information to the database and to the remote storage driver.

5. The distributed computing system of claim 4, wherein the remote storage driver updates a current state of the external storage using information from the activation service.

6. The distributed computing system of claim 3, further comprising a plurality of machines each having an activation service with a timer, wherein when a first activation service updates the usage information before a second activation service's timer expires, then the second activation service provides the first activation service's updated usage information to its respective remote storage driver.

7. The distributed computing system of claim 1, wherein the machine is selected from the group consisting of a processor, a virtual machine, and a server.

8. A computer-implemented method, comprising:
reading a storage limit and a storage usage from a database in a cloud service, wherein the storage limit and storage usage are associated with a storage system external to the cloud service;
creating a process on the cloud service, wherein the process is configured to access the external storage system;
configuring a storage driver on the cloud service to monitor access to the external storage system by the process and to enforce storage limits for the external storage system; and
checking the database for an updated storage usage, wherein if the updated storage usage is present, then providing the updated storage usage to the storage driver, and wherein if the updated storage usage is not present, then scanning the external storage to obtain the updated storage usage.

9. The method of claim 8, further comprising:
saving the updated storage usage obtained from the external storage scanning to the database.

10. The method of claim 8, further comprising:
initiating a timer to determine how often to check the database for the updated storage usage.

11. The method of claim 8, further comprising:
creating two or more additional processes on the cloud service, wherein the two or more additional processes are also configured to access the external storage system;
configuring a separate storage driver to monitor access to the external storage system and to enforce storage limits on the external storage system for each of the two or more additional processes; and
independently checking the database on behalf of each separate storage driver to detect the updated storage usage, wherein if the updated storage usage is present, then providing the updated storage usage to the storage driver for which the database check was performed.

12. The method of claim 11, further comprising:
initiating timers associated with each separate storage driver to determine how often to check the database for the updated storage usage.

13. The method of claim 8, wherein the process and the storage driver are running on a same processor, virtual machine, or server.

14. The method of claim 8, further comprising:
intercepting, by the storage driver, reads and writes from the process to the external storage system; and
updating a local state in the storage driver, based upon the intercepted reads and writes, to track the process's usage of the external storage system.

15. The method of claim 14, further comprising:
blocking, by the storage driver, the reads and writes from the process to the external storage system when the local state exceeds the storage limit.

16. The method of claim 14, further comprising:
overwriting the local state in the storage driver when the updated storage usage is present in the database.

17. The method of claim 14, further comprising:
saving the updated storage usage as determined by scanning the external storage to the database; and
overwriting the local state in the storage driver using the updated storage usage as determined by scanning the external storage.

18. A computer-implemented method, comprising:
configuring a storage driver on a cloud service to monitor access to an external storage system by a process and to enforce storage limits for the external storage system;
intercepting, by the storage driver, reads and writes from the process to the external storage system;
updating a local state in the storage driver, based upon the intercepted reads and writes, to track the process's usage of the external storage system;
periodically checking a database for an updated storage usage, wherein if the updated storage usage is present, then providing the updated storage usage to the storage driver, and wherein if the updated storage usage is not present, then scanning the external storage to obtain the updated storage usage; and
overwriting the local state in the storage driver with the updated storage usage.

19. The method of claim 18, further comprising:
blocking, by the storage driver, the reads and writes from the process to the external storage system when the local state exceeds the storage limit.

20. The method of claim 18, further comprising:
continuing to update the local state in the storage driver, based upon the intercepted reads and writes, after overwriting the local state with the updated storage usage.

* * * * *